Feb. 10, 1959   E. V. BERGSTROM ET AL   2,873,177
MULTI-ZONE KILN
Filed Sept. 4, 1956   4 Sheets-Sheet 4

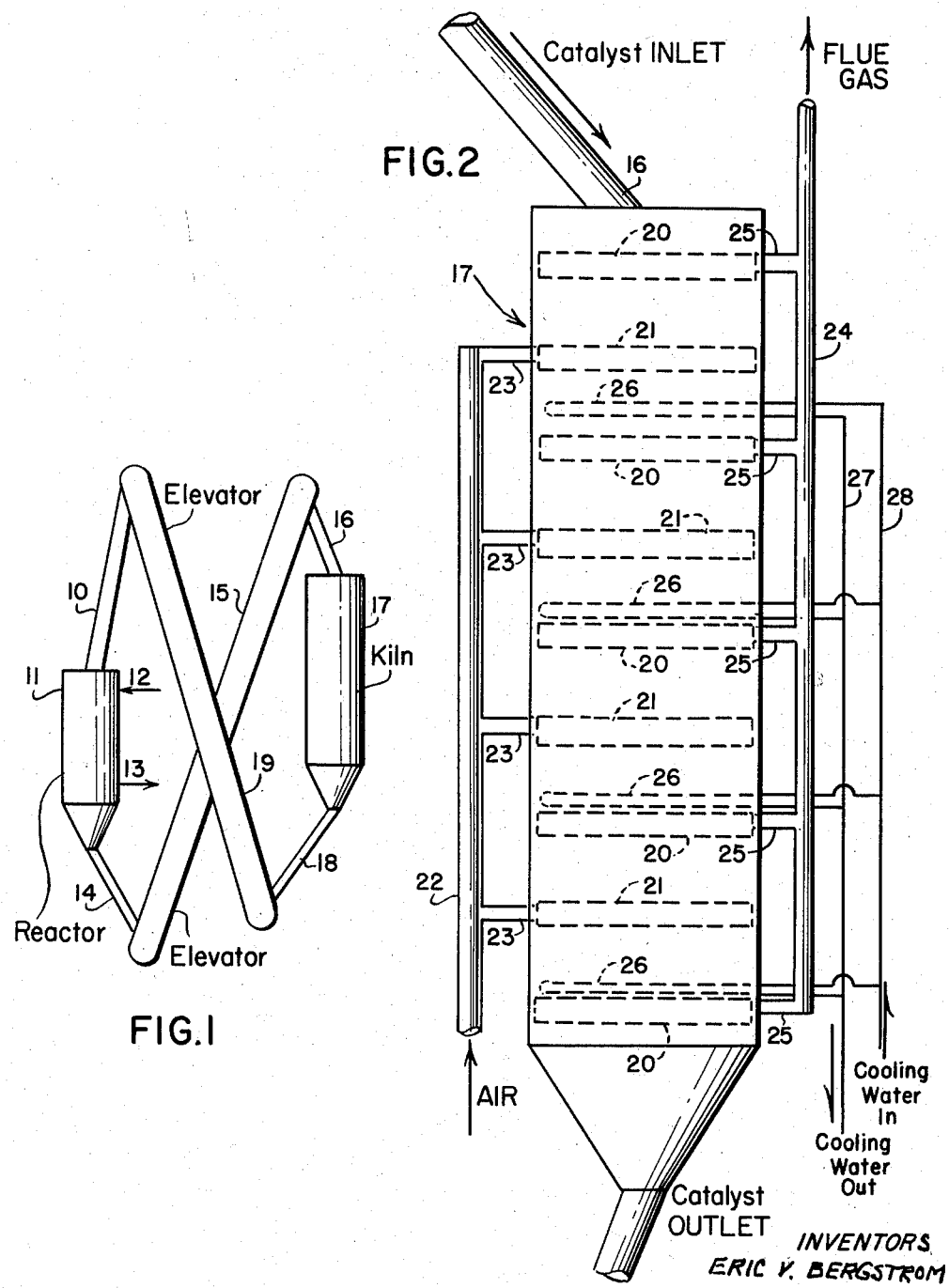

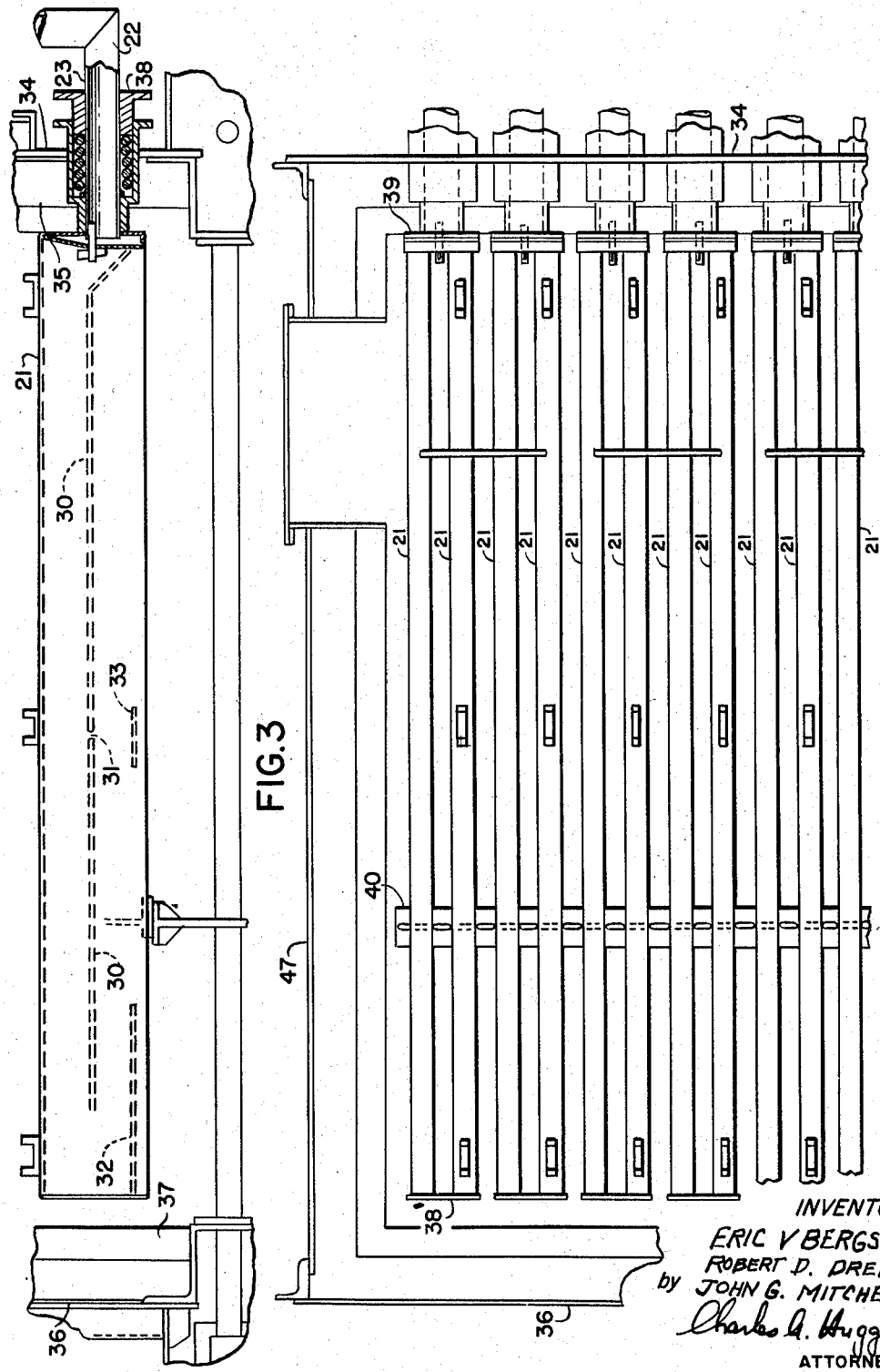

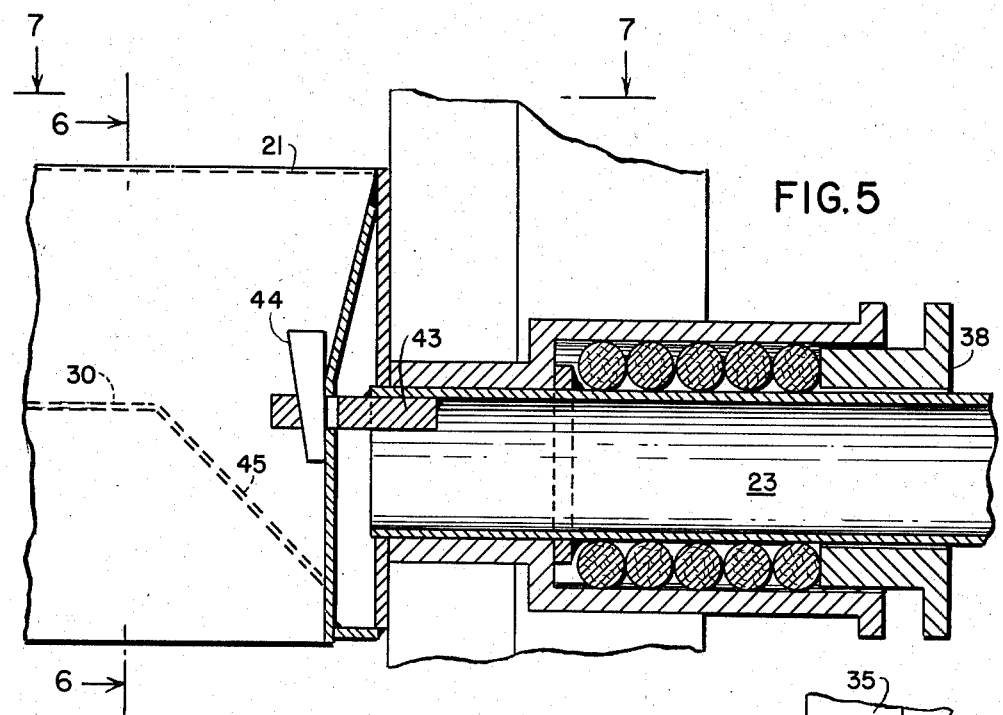
FIG. 5
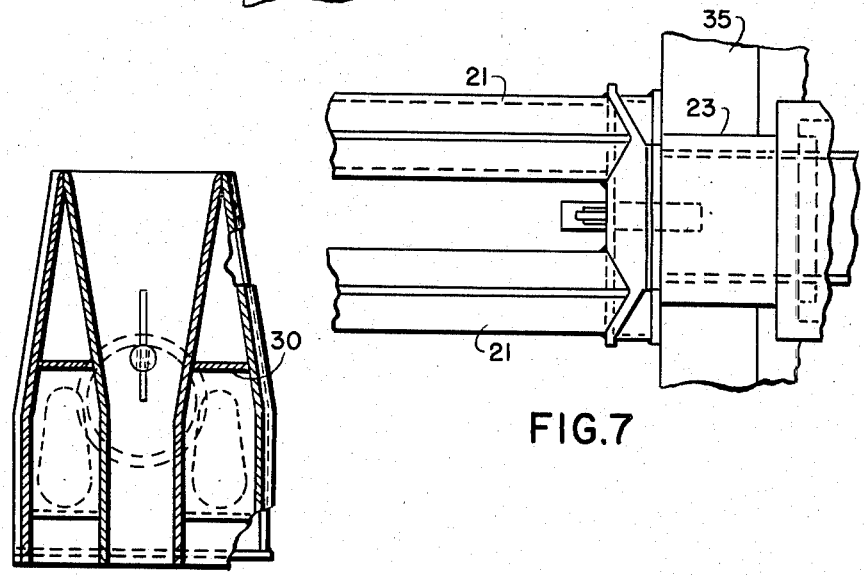
FIG. 6
FIG. 7

INVENTORS
ERIC V. BERGSTROM
ROBERT D. DREW
by JOHN G. MITCHELL
Charles A. Huggett
ATTORNEY "# United States Patent Office

2,873,177
Patented Feb. 10, 1959

2,873,177

MULTI-ZONE KILN

Eric V. Bergstrom, Short Hills, and Robert D. Drew, Wenonah, N. J., and John G. Mitchell, Larchmont, N. Y., assignors to Socony Mobil Oil Company, Inc., a corporation of New York Application September 4, 1956, Serial No. 607,776

2 Claims. (Cl. 23—288)

This invention relates to the regeneration of spent granular contact material in a regeneration zone through which the spent material is gravitated as a compact mass of particles. It particularly relates to an improvement in the kiln of a regenerator of a moving bed hydrocarbon conversion process in which a granular contact material or catalyst is gravitated as a compact mass first through a reaction zone where it is contacted with reactants, and then through a regeneration zone or kiln as a compact mass where it is contacted with air to effect removal of contaminants from the catalyst by burning.

Various types of hydrocarbon conversion processes have been developed and used commercially, such as cracking, reforming, desulfurization, alkylation, and the like. In these processes, it is preferred to pass the granular contact material or catalyst downwardly through the reaction zone at an elevated temperature as a compact gravitating bed. In the reaction zone the hydrocarbons, suitably prepared for treatment, are introduced in either the vapor, liquid, or mixed state, to flow through the voids in the bed and the converted products are removed from the reaction zone to further processing apparatus. During this conversion, a cokey material is deposited on the catalyst and within the pores of the catalyst. This cokey material, formed of relatively heavy hydrocarbons, reduces the activity of the catalyst and must be removed before the catalyst can be re-used. It is customary therefore in these processes, such as cracking or reforming, to withdraw the spent catalyst from the bottom of the reactor and introduce it into the top of a kiln for regeneration.

It has been customary to pass the spent catalyst downwardly through the kiln as a compact gravitating mass. A multi-stage type kiln has been utilized in the past wherein the catalyst passes through a series of zones in its travel from the top to the bottom of the kiln. Gas inlet and gas discharge channels were located horizontally across the kiln to form the various burning zones. In between the zones or, in some instances, in the zones themselves, cooling pipes have been located to contact the gravitating catalyst and reduce the temperature of the catalyst to prevent excess temperature which would damage the catalyst. For example, various types of cracking catalyst cannot be heated to temperatures higher than 1200–1400° F. approximately, without having the catalytic activity permanently damaged. The catalyst introduced into the top of the kiln is generally at a temperature of about 800–900° F. which is suitable for combustion. If the particle temperature is substantially below this range, it must be heated in the upper portion of the kiln to initiate combustion. As the combustion proceeds in the top zone, the temperature rises to a maximum and the catalyst must then be cooled to prevent heat damage.

The catalyst, therefore, proceeds through the various zones in the multi-zone kiln with the temperature being raised during the burning stage and cooled during the cooling stage, so that the temperature fluctuates between the maximum beyond which heat damage would occur and the minimum below which combustion would no longer continue.

Many multi-stage kilns have been used commercially in moving bed cracking and reforming processes and many have an arrangement of channels in the kiln in which the combustion air is introduced to the channels from one side of the vessel and the combustion products are removed from the other side of the vessel. These channels comprise an inverted U-type metal member with the ends closed by vertical walls whereby the gas is forced to discharge from the channel through the open bottom end to contact the particles flowing downwardly around the channel. The combustion gas, such as air, is introduced into the channel through a conduit which projects through the wall of the kiln and into and through one end wall of the channel. The temperature in the region of the channel may be approximately 1000–1300° F. It is customary to introduce the air at a temperature of about 100° F. As the air proceeds to flow around the channel, it is heated by contact with the channel walls, by convection, and also by radiation. It has been found that this causes a substantial disparity in temperature to occur in the catalyst bed between the catalyst travelling downwardly near the wall through which the air is introduced to the channel and the catalyst travelling downwardly near the wall closest to the opposite end of the channel. The catalyst moving closest to the wall through which the air is introduced, is substantially colder than the catalyst moving closest to the opposite wall. It is found that this temperature is not equalized with the gravitation of the catalyst through the various zones, but that this temperature differential remains and, in fact, is increased from zone to zone. Since there is a limiting temperature beyond which the catalyst will be heat damaged, the kiln capacity is found to be limited at that maximum burning rate which provides the limiting temperature to catalyst travelling closest to the wall opposite the wall through which the air in introduced into the kiln and, therefore, the temperature of the catalyst in the remainder of the gravitating bed is substantially below the temperature which can be tolerated without heat damage. This, of course, limits the regenerating capacity of the kiln and limits the efficiency of the kiln.

It is an object of this invention to avoid the above-indicated difficulties.

It is a further object of this invention to provide an improved method of operating a multi-stage kiln.

It is a further object of this invention to provide improved method and apparatus for regenerating spent granular catalyst in a multi-stage kiln.

It is a further object of this invention to provide a method and apparatus for modifying a multi-stage kiln of the above described type to provide for increased burning capacity and increased efficiency of operation. These and other objects of the invention will be disclosed more fully in the following detailed description of the invention and the surrounding apparatus.

One aspect of this invention involves in a multi-stage kiln, which has inverted gas introduction channels located across the vessel at various levels and which has the air introduced into these channels through passageways communicating with one wall of the vessel and channel, the use of a confining means to restrict flow of air entering the channel to a confined passageway which discharges freely under the channel at the opposite end of the channel from the point of introduction, and which uses at least one bypass aperture in the passageway at at least one location intermediate the ends of the channel to discharge a controlled portion of the air under the channel to contact the bed of catalyst exposed thereunder,"

in such a way that the heat exchange between the hot metal and catalyst to the gas flowing under the channel is at a substantially uniform rate from one end of the channel to the other, and in such a way that the temperature of the catalyst beneath the channel in substantially uniform from one side of the vessel to the other.

The following figures are presented to provide an understanding of the invention:

Figure 1 shows diagrammatically a complete moving bed system, such as the T. C. C. system;

Figure 2 shows, in vertical elevation, a multi-stage kiln of the type to which this invention applies;

Figure 3 shows, in vertical section, a single channel for the multi-stage kiln of Figure 2;

Figure 4 shows a plan view of a portion of the multi-stage kiln of Figure 2;

Figure 5 is an enlarged detailed view of the apparatus for introducing gas through the wall of the kiln into the channel;

Figure 6 is a vertical sectional view of the channel as seen on plan 6—6 of Figure 5;

Figure 7 is a plan view of the channel as seen on plan 7—7 of Figure 5.

Figure 9:
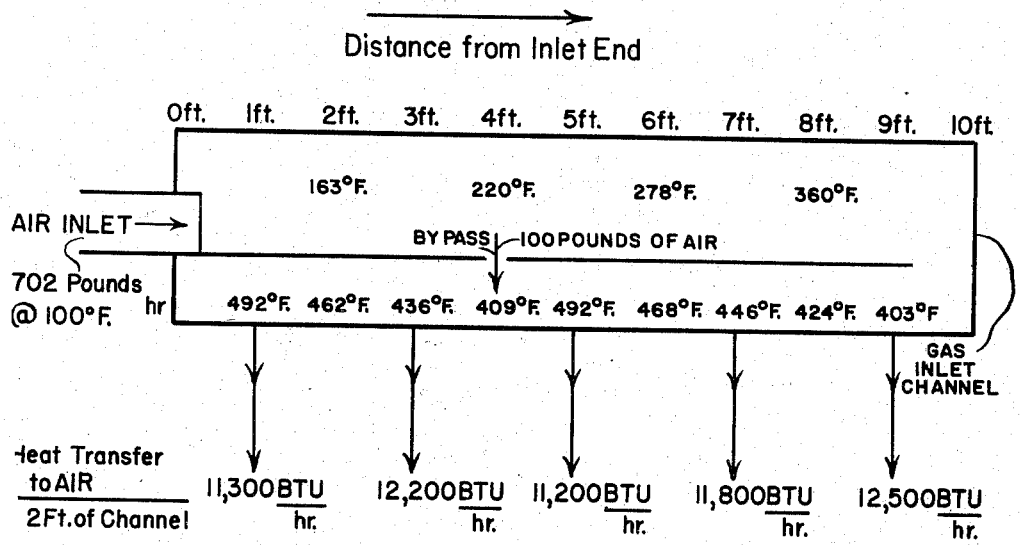

Referring now to Figure 1, the general moving bed scheme of operation is there depicted in which grannular catalyst or contact material is gravitated through a leg 10 into the top of a reaction vessel 11. For purpose of illustration, this may be a T. C. C. system in which a granular cracking catalyst is introduced into a reactor 11 and hydrocarbons prepared for conversion are introduced into the top of the vessel through a conduit 12. The hydrocarbons are passed downwardly through the voids in the gravitating bed within the reactor and the cracked products removed from the bottom of the vessel through a conduit 13. The temperature within the vessel may be maintained at about 800–1000° F., and the pressure within the vessel may be maintained at about 10 pounds per square inch gauge, being sufficient to transfer the cracked products through the further treating apparatus attached to conduit 13 (not shown). During the gravitation of the catalyst through the vessel 11 the catalyst becomes contaminated with a coke deposit and the spent catalyst is withdrawn by gravity from the bottom of the vessel through the conduit 14. The spent catalyst is elevated through the elevator 15 and discharged through the conduit 16 into the top of the multi-stage kiln 17. The details of the kiln will be described hereinafter. During the transfer of the catalyst through the kiln in gravity flowing form, the catalyst is contacted with air and combustion of the coke deposits occurs, rendering the catalyst usable for re-use in the process. The temperature in the kiln may be in the neighborhood of about 1000–1400° F., the precise temperature depending upon many factors. The regenerated catalyst is removed from the bottom of the kiln through the conduit 18 and transported through the elevator 19 to the top of the conduit 10, thereby completing the cyclic path.

Referring now to Figure 2, the kiln 17 is shown in more detail. The catalyst discharged through the conduit 16 into the top of the kiln 17, spreads laterally to cover the entire internal cross-section of the vessel and gravitates downwardly between rows of gas discharge channels 20 and gas introduction channels 21. These channels comprise generally U-shaped metallic members which are elongated to substantially span the vessel and which have end enclosure plates, permitting gas to escape only from the bottom exposed portion of the channel. While the catalyst may be of various shapes and sizes, an acceptable configuration comprises an elongated vertical vessel of rectangular cross-section with the channels arranged across the width of the vessel in parallel arrangement. Air is forced by means of a blower, not shown, through a manifold 22 and connecting pipes 23, which pass through one end wall of the channel to discharge under the channel. The gas outlet channels are similarly connected to a manifold 24 by means of connecting conduits 25. The gas outlet conduits 25 are preferably arranged on the opposite side of the vessel from the gas inlet conduits 23. In order to prevent overheating of the catalyst, cooling coils 26 are suitably arranged in one or more of the burning zones and connect with headers 27 and 28, providing a circulating system through which a cooling medium, such as water, or a mixture of water and steam, may be prepared to extract heat from the burning regions.

In normal operation, the catalyst introduced through the inlets 16 will be at a temperature of approximately 900° F., which is sufficient to initiate combustion of the coke deposits when the catalyst is brought into contact with sufficient oxygen or air. As the catalyst gravitates through the first combustion zone, which in the scheme depicted on Figure 2 is a split combustion zone, the catalyst temperature rises. As the catalyst passes around the gas introduction channel, a certain amount of cooling is effected because of the introduction of cold air into the mass of catalyst and this is desirable and is, in fact, utilized in the operation of the kiln. As the catalyst gravitates below the gas introduction channel, the temperature rises again to a maximum temperature, which temperature may be sufficiently high to require cooling in order to prevent an excess temperature which would cause heat damage to the catalyst and which would render it unfit for further use in the process. Since it is exceedingly desirable not to have any substantial portion of the catalyst heat damaged so as to be unusable for cracking purposes, the operation of the kiln must be so arranged that this temperature is not exceeded and, therefore, this limitation provides a limitation on the operation of the entire kiln. If the temperature of the catalyst across the bed is uneven, the catalyst experiencing the highest temperature must be limited at the heat damaging level and hence, the remaining catalyst will be below the heat damaging level. Since the amount of coke that can be burned is largely dependent upon the catalyst temperature, less coke will be burned in those regions which have a catalyst temperature below the heat damaging level than in the region which has a temperature at the heat damaging level. Therefore, the burning will be uneven and the efficiency of combustion not maximum.

It has been discovered in commercial kilns of the type described above with respect to Figure 2, that where the air is introduced into the inlet channels 21 through the conduits 23 at a temperature of say 100° F., that the temperature of the catalyst passing downwardly along the wall closest to the conduits 23 is substantially colder than the catalyst travelling downwardly along the wall closest to the conduits 25. This temperature differential is caused primarily by the fact that the rate of heat exchange beween the catalyst and the gas is substantially greater at the end of the channels 21 closest to the conduits 23 than it is at the end of the channel 21 closest to the conduits 25 and, furthermore, there is a substantial cooling effect of the cooled gas contacting the bed of catalyst nearest to the location where it enters the channel. It had always been considered that there would be a sufficient amount of transfer laterally within the catalyst bed to prevent any substantial temperature differenials from being set up across the bed. However, this has been found to be untrue with the catalyst apparently providing a fairly high insulating medium which prevents lateral transfer of the heat through the bed with the result that unequal temperatures set up across the bed are accumulated from zone to zone.

Figure 3 shows a modification of the channels designed to obviate this difficulty and provide more uniform catalyst temperatures across the gravitating bed in multi-zone kilns whereby the efficiency of the kiln and the burning rate of the kilns can be increased. A single channel 21 is shown in section on Figure 3. Underneath the channel at an intermediate level between the top and bottom of the channel, is located a baffle 30 which extends horizontally from one side of the channel to the other and from one end of the channel substantially to the other end. For example, in one commercial installation in a kiln of 8 feet cross-section, a channel of about 7 feet 9 inches was used and the baffle extended to about 8 inches from the end of the channel. At the inlet end of the channel the baffle was bent downwardly at an angle of about 45 degrees so as to confine all of the incoming air to the region above the baffle. The baffle is so arranged in the channel that there is no substantial impedance to the flow of the air in the region above the baffle, the air travelling in confined flow above the baffle directly along the length of the channel to the opposite end thereof. The major portion of the air then travels downwardly and back along the length of the channel under the baffle 30, entering the exposed bed of catalyst therebeneath at a fairly uniform rate along the length of the channel. Intermediate the length of the baffle 30, for example, approximately half the length of the baffle, is located a slot 31. This slot 31 may be an aperture cut in the baffle 30 or for practical reasons, the baffle 30 may be formed in two parts with an opening left in between the two parts so as to provide a slot 31 of the required dimensions. This slot is so sized as to provide a substantial restriction on the flow of gas therethrough, whereby only a minor portion of the gas passing above the baffle 30 is allowed to bypass through the slot 31. This bypass gas mingles with the gas flowing under the baffle and the flow rate of gas through the slot and location of the slot with respect to the end of the channel are so arranged that the rate of heat transfer from the mass of catalyst to the air travelling over and under the baffle is substantially uniform from one end of the channel to the other, and the air entering the exposed mass of catalyst under the channel is substantially uniform at the point of introduction into the catalyst mass from one end of the channel to the other. While not absolutely essential, short baffles 32 and 33 can be arranged horizontally across the channel beneath the incoming streams to cause diffusion of the gas horizontally beneath the channel. For example, baffle 32 is arranged at the outer end of the channel to aid in the change of direction of the gas at the end of the channel, thereby directing it back through the channel beneath the baffle 30. Short baffle 33 is located horizontally near the bottom of the channel directly beneath the aperture 31 so as to prevent direct impingement of the bypass gas upon the catalyst directly beneath the aperture. The baffle 33 tends to diffuse this bypass gas in the remainder of the gas under the baffle 30, thereby providing more uniform temperature distribution. Detail 34 shows a portion of the wall of the kiln 17 to which is attached the insulation 35. Detail 36 shows the opposite wall of the vessel to which is attached the insulation 37. A stuffing box 38 is shown surrounding the inlet conduit 23, which conduit is seen to be attached to the manifold 22.

Referring now to Figure 4, which shows a plan view of the gas inlet channels, the channels 21 are seen to be arranged in pairs with end plates 38' and 39 closing the alternate ends of both channels. The channels are supported intermediate their length on a tube support 40. Three of the four outer walls of the vessel 17 are shown on Figure 4 as details 34, 36 and 41.

Referring now to Figure 5, the connection of the channels 21 with the conduits 23, is shown in more detail. The suffing box 38 is there illustrated and the attachment of the channels 21 to the conduit 23 by means of lug 43 welded to the conduit 23 and tapered wedge 44, are there shown. The bent portion of the baffle 30 is illustrated as detail 45 shown directing the air to the upper portion of the channel out of direct contact with the gravitating catalyst.

Referring now to Figure 6, the end of a pair of the channels is illustrated showing how the air is permitted to enter the upper portion of the channel above the baffle 30 for transfer through the channel. As seen, the channels are preferably not of an exact U-shape form, but have steeply sloping side walls which give the upper portion of the channels an inverted V-section. This is done to facilitate transfer of the gravitating catalyst around the channels and the sloping wall of the channels is made steep enough so that stagnant beds of catalyst will not be located above the channel. Catalyst withdrawn from an outlet beneath a gravitating bed flows through the bed to the outlet at an angle of about 70 degrees or greater and, therefore, the upper portion of the side walls of the channels is located at an angle steeper than about 70 degrees so as to prevent the formation of stagnant beds or stagnant regions in the gravitating catalyst bed.

Figure 7 shows a small detail in plan of the attachment of the dual channel members 21 to the conduit 23 projected through the wall 35 of the kiln 17.

*Example No. 1*

Figure 8:
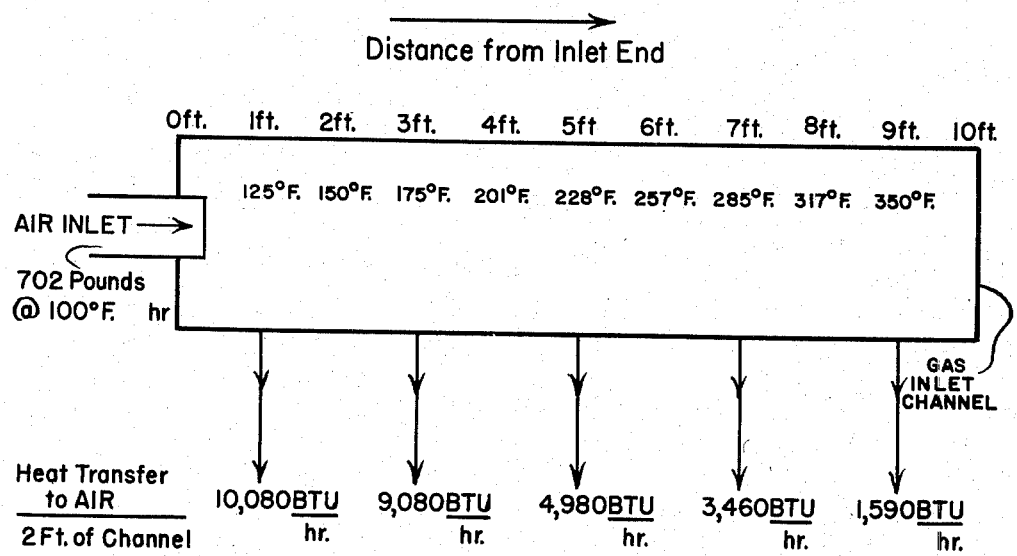

Figures 8 and 9 illustrate how the invention, when applied to a commercially operating T. C. C. having a multi-zone kiln of the type previously described, effectively accomplishes the objectives of the invention. Figure 8 shows typically in a highly diagrammatic form a channel of the type described being approximately 10 feet in length and having the air introduced at about 100° F. at the zero foot or left end of the channel. As is seen from the figure, 702 pounds per hours of air are introduced under the channel and the air temperature measured at each foot of the channel from left to right increases gradually from 125° F. at the 1 foot distance to 350° F. at the 9 foot distance. The heat transfer rates to the air are shown on the figure for each 2 feet of channel length, being about 10,000 B. t. u. per hour near the 1 foot point and only 1600 B. t. u. per hour near the 9 foot point. Figure 9 shows the same channel as modified by the invention being similar to the installation as shown on Figure 3. The same amount of air is introduced at the same temperature of 100° F. and the temperature of this air rises as the air passes in confined flow above the baffle within the channel. Approximately 100 pounds per hour of air is bypassed through the aperture in the baffle at the 4 foot length with the remainder of the air passing around the end of the baffle at the opposite end of the channel from the air inlet. As is seen on Figure 9, the temperature of the air entering the bed of catalyst under the channel is substantially uniform, having a maximum variation of 89° F. from one side of the channel to the other. It is also noticed that the heat transfer to the air, shown on Figure 9 for each 2 foot length of channel, has been made substantially uniform, varying as a maximum from a low of 11,000 B. t. u. per hour to a high of 12,000 B. t. u. per hour.

Each and every inlet channel of the multi-zone kiln may be modified by this invention as above described. However, it is not absolutely essential that the lowermost zones of the kiln be modified. It generally occurs that the maximum temperature experienced in the kiln will be found in an intermediate zone. For example, for a commercially operating eight zone kiln, the maximum temperature was found to occur at the fifth zone from the top of the vessel. Therefore, if the first five zones of this kiln are modified, adequate burning capacity will be provided in the lowermost three zones so that modification of these zones is not absolutely required.

This invention has been illustrated by the above detailed description and also by the specific application of the invention to a commercially operating T. C. C. unit. However, it is not intended to limit the invention to the precise structure and mode of operation above described.

The only limitations intended are those found in the appended claims.

We claim:

1. In a multi-stage kiln adapted for the regeneration of a gravitating bed of spent catalyst composed of a vertical vessel having inlet at top and outlet at bottom, inverted gas introduction channels located substantially horizontally disposed across the vessel at staged levels and gas outlet located at staged levels intermediate the gas inlets, gas introduction means projected through one wall of the vessel to supply gas directly under and at one end of each of the gas introduction channels, the improvement comprising: means located beneath the gas introduction channel to confine the gas out of direct contact with the catalyst from the point of gas introduction under the channel to the opposite end of the channel, at least one aperture in said means located at at least one suitable location along the length of the channel, to bypass a restricted portion of the gas from said means for direct introduction into the catalyst bed beneath the channel, said aperture being sized to provide substantially uniform catalyst temperature beneath the channel, substantially uniform gas flow into the bed at all points along the length of the channel and substantially uniform heat transfer to the gas at all locations along the length of the channel, whereby irregular temperature distribution across the bed of catalyst at various levels in the kiln is avoided.

2. In a multi-stage kiln used to regenerate in continuous gravitating flow a column of spent catalyst subject to heat damage from excessive temperature, said kiln having gas inlet channels formed from inverted U-shaped members closed at the ends and open on the bottom, said U-shaped channels being mounted horizontally in the kiln at staged levels and communicating with an air supply through one end of each channel, the improvement comprising a horizontal baffle located intermediate the top and bottom of the channel, so as to confine the flow of gas to the upper portion of the channel and out of direct contact with the catalyst bed, the baffle terminating short of the end of the channel, to permit the gas to flow between the end of the channel and the terminus of the baffle to reach the exposed surface of the catalyst bed beneath the channel, at least one slot in the baffle at at least one location along the length of the channel, the slot being sized to bleed that portion of the air from its confined path to direct contact with the catalyst as is required to provide substantially uniform catalyst temperature beneath the channel at all points along the length of the channel, and substantially uniform gas flow into the catalyst bed at all points along the length of the channel, and substantially uniform heat transfer rates to the gas under the channel at all points along the length of the channel, whereby non-uniform catalyst temperature across the catalyst bed is avoided.

References Cited in the file of this patent

UNITED STATES PATENTS

| | | |
|---|---|---|
| 2,458,356 | Evans | Jan. 4, 1949 |
| 2,625,467 | Barker | Jan. 13, 1953 |